US011807248B2

(12) United States Patent
Leung et al.

(10) Patent No.: US 11,807,248 B2
(45) Date of Patent: *Nov. 7, 2023

(54) SYSTEM AND METHOD FOR LOW-LEVEL CONTINUOUS DRIVER TRAINING

(71) Applicant: BlueOwl, LLC, San Francisco, CA (US)

(72) Inventors: Theobolt N. Leung, San Francisco, CA (US); Micah Wind Russo, Oakland, CA (US); Eric Dahl, Newman Lake, WA (US); Gareth Finucane, San Francisco, CA (US)

(73) Assignee: BlueOwl, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,560

(22) Filed: Jan. 12, 2023

(65) Prior Publication Data
US 2023/0145141 A1 May 11, 2023

Related U.S. Application Data

(63) Continuation of application No. 17/387,674, filed on Jul. 28, 2021, now Pat. No. 11,577,735, which is a
(Continued)

(51) Int. Cl.
*B60W 40/09* (2012.01)
*G07C 5/08* (2006.01)
(Continued)

(52) U.S. Cl.
CPC .......... *B60W 40/09* (2013.01); *G06Q 30/0207* (2013.01); *G06Q 40/08* (2013.01); *G06V 20/597* (2022.01); *G07C 5/0841* (2013.01)

(58) Field of Classification Search
CPC . B60W 40/09; G07C 5/0841; G06K 9/00845; G06Q 40/08; G06Q 30/0207
See application file for complete search history.

(56) References Cited

U.S. PATENT DOCUMENTS 9,892,573 B1 * 2/2018 Hsu-Hoffman ........ G07C 5/008
10,282,944 B2 5/2019 Rader et al.
(Continued)

*Primary Examiner* — Omer S Khan
(74) *Attorney, Agent, or Firm* — Faegre Drinker Biddle & Reath LLP

(57) ABSTRACT

Systems and methods for providing continuous safe-driver training safely are provided. A safe-driving challenge may be presented to an operator of a vehicle. Data captured by sensors associated with the vehicle may be analyzed to determine whether the operator of the vehicle has completed the safe-driving challenge. Based on a determination that the operator of the vehicle has completed the safe-driving challenge, a notification may be provided to the operator (e.g., indicating to the operator that he or she has successfully completed the challenge). A processor may randomly select whether a reward is to be provided to the operator of the vehicle based on the determination that the operator of the vehicle has completed the safe-driving challenge. Moreover, if a reward is to be provided to the operator of the vehicle, a processor may randomly select a type of reward to be provided to the operator of the vehicle.

20 Claims, 4 Drawing Sheets

Related U.S. Application Data continuation of application No. 16/205,970, filed on Nov. 30, 2018, now Pat. No. 11,104,349.

(51) Int. Cl.
*G06Q 40/08* (2012.01)
*G06Q 30/0207* (2023.01)
*G06V 20/59* (2022.01)

(56) References Cited

U.S. PATENT DOCUMENTS

| | | | |
|---|---|---|---|
| 10,403,057 B1 | 9/2019 | Fawcett et al. | |
| 2003/0061098 A1* | 3/2003 | Meyer | G06Q 20/387 705/14.14 |
| 2013/0311250 A1 | 11/2013 | Hickethier et al. | |
| 2014/0195272 A1 | 7/2014 | Sadiq et al. | |
| 2014/0322676 A1 | 10/2014 | Raman | |
| 2015/0081404 A1* | 3/2015 | Basir | G06Q 30/08 705/14.1 |
| 2016/0163217 A1* | 6/2016 | Harkness | G09B 5/06 434/65 |
| 2016/0163229 A1 | 6/2016 | Ihara | |
| 2016/0196613 A1* | 7/2016 | Miles | G01W 1/00 705/4 |
| 2018/0025580 A1* | 1/2018 | Rader | G07F 17/3255 463/16 |

\* cited by examiner

SYSTEM AND METHOD FOR LOW-LEVEL CONTINUOUS DRIVER TRAINING

CROSS-REFERENCE TO RELATED APPLICATIONS

This application is a continuation of U.S. patent application Ser. No. 17/387,674, filed Jul. 28, 2021, which is a continuation of U.S. patent application Ser. No. 16/205,970, filed Nov. 30, 2018, the disclosures of which are hereby expressly incorporated by reference herein in their entirety.

FIELD OF THE DISCLOSURE

The present disclosure generally relates to vehicle safety and, more particularly, to providing continuous safe-driver training.

BACKGROUND

Most drivers take a driver's education courses when they are first learning to drive. However, most drivers do not continue to learn safe driving techniques after completing the initial driver's education course and passing a driving test to obtain a driver's license. While additional courses such as traffic school classes and defensive driver training are effective in helping drivers drive more safely, drivers often do not take advantage of these opportunities to improve their driving because these types of courses are costly and time consuming. As a result, many drivers on the road are not properly trained or skilled, or have lapsed training.

SUMMARY

In one aspect, a computer-implemented method of providing continuous safe-driver training is provided. The computer-implemented method includes presenting, by a processor, a safe-driving challenge to an operator of a vehicle; analyzing, by a processor, data captured by sensors associated with the vehicle to determine that the operator of the vehicle has completed the safe-driving challenge; generating, by a processor, based on the determination that the operator of the vehicle has completed the safe-driving challenge, a notification to the operator; and randomly selecting, by a processor, whether a reward is to be provided to the operator of the vehicle based on the determination that the operator of the vehicle has completed the safe-driving challenge.

In another aspect, a computer system for providing continuous safe-driver training is provided. The computer system includes one or more processors and one or more memories. The one or more memories store instructions that, when executed by the one or more processors, cause the computer system to present a safe-driving challenge to an operator of a vehicle; analyze data captured by sensors associated with the vehicle to determine that the operator of the vehicle has completed the safe-driving challenge; generate, based on the determination that the operator of the vehicle has completed the safe-driving challenge, a notification to the operator; and randomly select whether a reward is to be provided to the operator of the vehicle based on the determination that the operator of the vehicle has completed the safe-driving challenge.

In still another aspect, a computer-readable storage medium for having stored thereon a set of instructions for providing continuous safe-driver training is provided. The set of instructions is executable by a processor. The instructions include instructions for presenting a safe-driving challenge to an operator of a vehicle; analyzing data captured by sensors associated with the vehicle to determine that the operator of the vehicle has completed the safe-driving challenge; generating, based on the determination that the operator of the vehicle has completed the safe-driving challenge, a notification to the operator; and randomly selecting whether a reward is to be provided to the operator of the vehicle based on the determination that the operator of the vehicle has completed the safe-driving challenge.

DETAILED DESCRIPTION

Figure 1A:
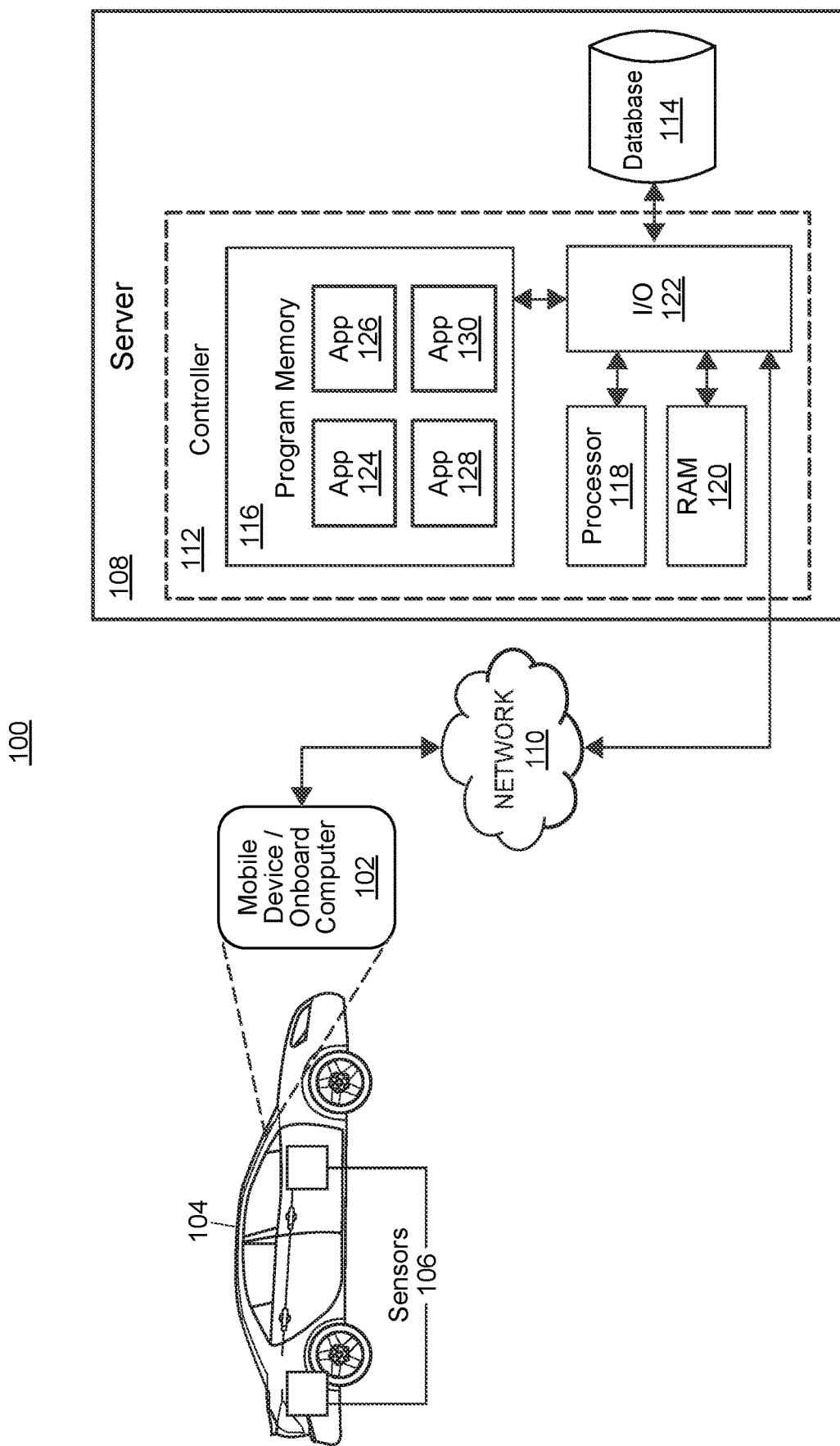
FIG. 1A illustrates an exemplary computer system for providing continuous safe-driver training, in accordance with some embodiments.

Most drivers take a driver's education courses when they are first learning to drive. However, most drivers do not continue to learn safe driving techniques after completing the initial driver's education course and passing a driving test to obtain a driver's license. While additional courses such as traffic school classes and defensive driver training are effective in helping drivers drive more safely, drivers often do not take advantage of these opportunities to improve their driving because these types of courses are costly and time consuming. As a result, many drivers on the road are not properly trained or skilled, or have lapsed training.

A mobile device based driver training course can be incremental and require only a small amount of a driver's time (over a period of time) to allow for low-level continuous learning and improvement of driving skills. The course may be framed as a "game" including safe-driving-related challenges, quests, and/or missions for the driver. The challenges, quests, and/or missions may present the user with a bounded goal with achievement criteria, evaluation criteria, and progression criteria.

The challenges may include a time or a number of trips component. For example, a challenge may be to complete 10 trips without hard braking. As another example, a challenge may be to drive for one week without exceeding speed limits. As still another example, the challenge may be a challenge related to maintaining a "streak" of trips without hard braking, e.g., compared to previous personal record. In some instances, a driver may be presented with a particular challenge based on vehicle telematics data associated with the driver. For example, a driver whose telematics data indicates repeated issues with cornering may be presented with a cornering-related challenge.

Upon completion of a challenge, a driver may progress to a more difficult or more nuanced challenge. For example, after completing 10 trips without hard braking, the driver may progress to a challenge that requires 20 trips without hard braking. As another example, after completing 10 trips without hard braking, the driver may progress to a challenge that requires multiple safe driving skills, e.g., the challenge may be to complete 10 trips without hard braking or exceeding a speed limit. The challenges may be interspersed with guidance, information, videos, and/or tips. In some instances, the challenges may be presented within the context of an overarching lesson and/or unit, e.g., a speeding lesson. During a speeding lesson, for example, the driver may be presented with guidance with respect to speed limits, as well as information about the danger of exceeding speed limits (e.g., risk statistics for driving 10 miles over the speed limit, 20 miles, etc.), while a speed-limit related challenge is in progress. The lesson may also include data extracted from vehicle telematics data—e.g., indicating situations in which the driver typically speeds and how to avoid those situations. For example, the lesson may include an indication that the driver typically speeds around 8:30 am, during rush hour. In this case, for example, the lesson may include a tip about reducing speeding by leaving a little earlier. As another example, a braking lesson may include an indication that the driver typically brakes in certain freeway situations. In this case, for example, the lesson may include a tip about avoiding tailgating on the freeway in order to reduce the need for hard braking.

Moreover, upon completion of challenges or lessons, a driver may receive certain rewards. The nature and the timing of a reward may vary based on the driver receiving the reward, and/or may vary based on the challenge or lesson completed. Moreover, drivers may not receive rewards for every challenge or lesson completed. Specifically, the timing and nature of these rewards may be structured so that drivers see these rewards as exciting surprises rather than expected compensation. Types of rewards may range from discounts to promotional items to opportunities for participating in trials or beta testing of new programs. Advantageously, a company, such as an insurance company, may simultaneously reward drivers for their participation in a safe driving course while distributing promotional items and testing new programs. Moreover, certain new programs may benefit from testing on drivers who complete safe driving courses. For example, a rental vehicle program may be best tested on safer drivers.

Referring now to FIG. 1A, an exemplary computer system 100 for providing continuous safe-driver training is illustrated, in accordance with some embodiments. The high-level architecture illustrated in FIG. 1A may include both hardware and software applications, as well as various data communication channels for communicating data between the various hardware and software components, as is described below.

As shown in FIG. 1A, a mobile device and/or on-board computer 102 (shown in greater detail at FIG. 1B) may be associated with a vehicle 104 (which may be, e.g., a car, a truck, a boat, a motorcycle, a motorized scooter, or any other vehicle), and may be configured to present messages, notifications, or other information to an operator of a vehicle, e.g., via a user interface 152, as shown in FIG. 1A. Specifically, the mobile device and/or on-board computer 102 may present a safe-driving challenge to the vehicle operator. The mobile-device and/or onboard computer 102 may interface with sensors 106, which may capture vehicle telematics data and other suitable data associated with the vehicle. The mobile device and/or on-board computer 102 may be configured to communicate the captured sensor data to a server 108 via a network 110. By analyzing this captured sensor data, the server 108 may determine when vehicle operators complete safe-driving challenges that are presented to them.

Moreover, the server 108 may randomly select whether a reward is to be provided to a vehicle operator based on his or her completion of a safe-driving challenge. Additionally, by analyzing the data captured by the sensors 106, the server 108 may identify trends of a vehicle operator's operation of the vehicle 104 to generate new safe-driving challenges tailored to specific vehicle operators, e.g., a braking-related safe-driving challenge for a vehicle operator who struggles with braking, a speeding-related safe-driving challenge for a vehicle operator who struggles with speeding, etc.

As shown in FIG. 1A, the server 108 may include a controller 112 that may be operatively connected to the one or more databases 114 via a link, which may be a local or a remote link. The one or more databases 114 may be adapted to store data related to, inter alia, safe-driving challenges, including various levels of safe driving challenges, and/or safe-driving challenges designed to target various types of driving skills, indications of vehicle sensor readings associated with various types of driving, speed limits in different areas and on different road segments, language to be used in notifications provided to vehicle operators, possible rewards to be provided to vehicle operators, etc. It should be noted that, while not shown, additional databases may be linked to the controller 112. Additionally, separate databases may be used for various types of information, in some instances. Additional databases (not shown) may be communicatively connected to the server 108 via the network 110 in some embodiments.

The controller 112 may include one or more program memories 116, one or more processors 118 (which may be, e.g., microcontrollers and/or microprocessors), one or more random-access memories (RAMs) 120, and an input/output (I/O) circuit 122, all of which may be interconnected via an address/data bus. Although the I/O circuit 122 is shown as a single block, it should be appreciated that the I/O circuit 122 may include a number of different types of I/O circuits. The program memory 116 and RAM 120 may be implemented as semiconductor memories, magnetically readable memories, optically readable memories, or biologically readable memories, for example. Generally speaking, the program memory 116 and/or the RAM 120 may respectively include one or more non-transitory, computer-readable storage media. The controller 112 may also be operatively connected to the network 110 via a link.

The server 108 may further include a number of various software applications 124, 126, 128, 130 stored in the program memory 116. Generally speaking, the applications may perform one or more functions related to, inter alia, transmitting information to the mobile device and/or onboard computer 102, receiving information from the mobile device and/or onboard computer 102, presenting a safe-driving challenge to an operator of a vehicle; analyzing data captured by sensors associated with the vehicle to determine that the operator of the vehicle has completed the safe-driving challenge; generating, based on the determination that the operator of the vehicle has completed the safe-driving challenge, a notification to the operator; randomly selecting whether a reward is to be provided to the operator of the vehicle based on the determination that the operator of the vehicle has completed the safe-driving challenge; randomly selecting a type of reward to be provided to the operator of the vehicle based on the determination that the operator of the vehicle has completed the safe-driving challenge; presenting a second safe-driving challenge after the completion of the first safe-driving challenge, etc. For example, one or more of the applications 124, 126, 128, 130 may perform at least a portion of any of the method 300 shown in FIG. 3. The various software applications 124, 126, 128, 130 may be executed on the same processor 126 or on different processors. Although four software applications 124, 126, 128, 130 are shown in FIG. 1A, it will be understood that there may be any number of software applications 124, 126, 128, 130. Further, two or more of the various applications 124, 126, 128, 130 may be integrated as an integral application, if desired.

It should be appreciated that although the server 108 is illustrated as a single device in FIG. 1A, one or more portions of the server 108 may be implemented as one or more storage devices that are physically co-located with the server 108, or as one or more storage devices utilizing different storage locations as a shared database structure (e.g. cloud storage). In some embodiments, the server 108 may be configured to perform any suitable portion of the processing functions remotely that have been outsourced by the on-board computer and/or mobile device 102.

Figure 1B:
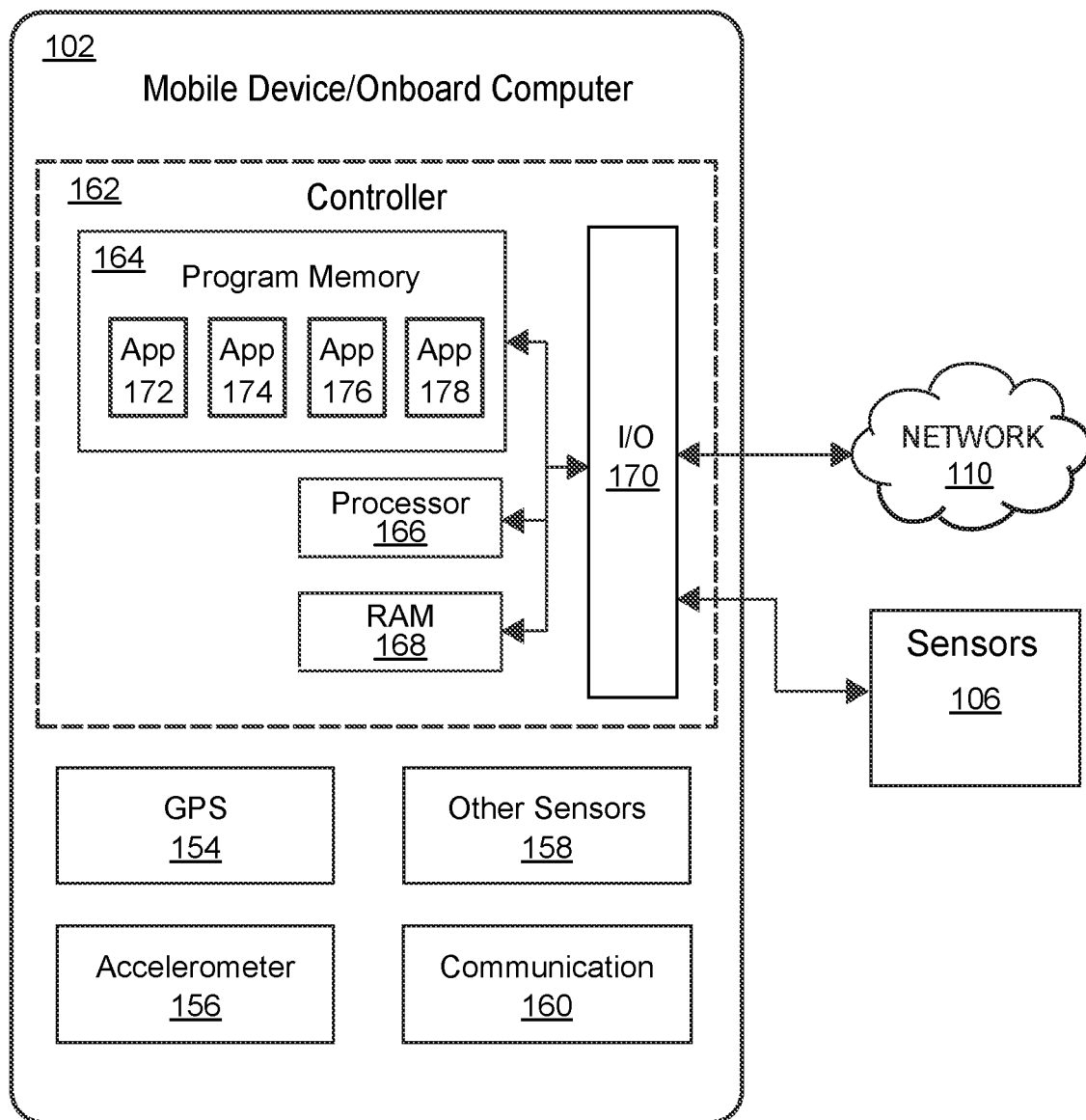
FIG. 1B illustrates an exemplary mobile device and/or onboard computer operable within the system of FIG. 1A, in accordance with some embodiments.

Referring now to FIG. 1B, the exemplary mobile device and/or onboard computer 102 associated with the vehicle 104 is illustrated in greater detail, in accordance with some embodiments. The mobile device and/or onboard computer 102 may include one or more of a GPS unit 154, an accelerometer 156, one or more other sensors 158, a communication unit 160, and/or a controller 162.

The GPS unit 154 may be disposed at the mobile device and/or onboard computer 102 and may collect data indicating the location of the mobile device and/or onboard computer 102, and/or (e.g., by proxy) the vehicle 104. Moreover, in some embodiments the GPS unit 140 may be a separate device disposed within or external to the vehicle 104 (e.g., one of the sensors 106), and interfacing with the mobile device and/or onboard computer 102. The accelerometer 156 may be disposed at the mobile device and/or onboard computer 102 and may collect data indicating the acceleration of the mobile device and/or onboard computer 102 and/or (e.g., by proxy) the vehicle 104. Moreover, in some embodiments the GPS unit 156 may be a separate device disposed within or external to the vehicle 104 (e.g., one of the sensors 106), and interfacing with the mobile device and/or onboard computer 102. In general, the GPS unit 154, an accelerometer 156, one or more other sensors 158, and the sensors 106 may be configured to capture vehicle telematics data associated with the vehicle 104, e.g., one or more of speed data, acceleration data, braking data, cornering data, following distance data, turn signal data, seatbelt use data, location data, date/time data, or any other suitable vehicle telematics data. The communication unit 160 may be disposed at the mobile device and/or onboard computer 102 and may, e.g., transmit and receive information from external sources such as, e.g., the server 108, e.g., via the network 110.

As shown in FIG. 1B, the mobile device and/or onboard computer 102 may include a controller 162 may include one or more program memories 164, one or more processors 166 (which may be, e.g., microcontrollers and/or microprocessors), one or more random-access memories (RAMs) 168, and an input/output (I/O) circuit 170, all of which may be interconnected via an address/data bus. Although the I/O circuit 170 is shown as a single block, it should be appreciated that the I/O circuit 170 may include a number of different types of I/O circuits. The program memory 164 and RAM 168 may be implemented as semiconductor memories, magnetically readable memories, optically readable memories, or biologically readable memories, for example. Generally speaking, the program memory 164 and/or the RAM 168 may respectively include one or more non-transitory, computer-readable storage media. The controller 162 may also be operatively connected to the network 110 via a link.

The mobile device and/or onboard computer 102 may further include a number of various software applications 172, 174, 176, 178 stored in the program memory 164. Generally speaking, the applications may perform one or more functions related to, inter alia, transmitting information to the server 108; receiving information from the server 108; presenting a safe-driving challenge to an operator of a vehicle; analyzing data captured by sensors associated with the vehicle to determine that the operator of the vehicle has completed the safe-driving challenge; generating, based on the determination that the operator of the vehicle has completed the safe-driving challenge, a notification to the operator; randomly selecting whether a reward is to be provided to the operator of the vehicle based on the determination that the operator of the vehicle has completed the safe-driving challenge; randomly selecting a type of reward to be provided to the operator of the vehicle based on the determination that the operator of the vehicle has completed the safe-driving challenge; presenting a second safe-driving challenge after the completion of the first safe-driving challenge, etc. For example, one or more of the applications 172, 174, 176, 178 may perform at least a portion of any of the method 300 shown in FIG. 3. The various software applications 172, 174, 176, 178 may be executed on the same processor 166 or on different processors. Although four software applications 172, 174, 176, 178 are shown in FIG. 1B, it will be understood that there may be any number of software applications 172, 174, 176, 178. Further, two or more of the various applications 172, 174, 176, 178 may be integrated as an integral application, if desired. Additionally, it should be appreciated that in some embodiments, the mobile device and/or onboard computer 102 may be configured to perform any suitable portion of the processing functions described as being performed by the server 108.

Figure 2A:
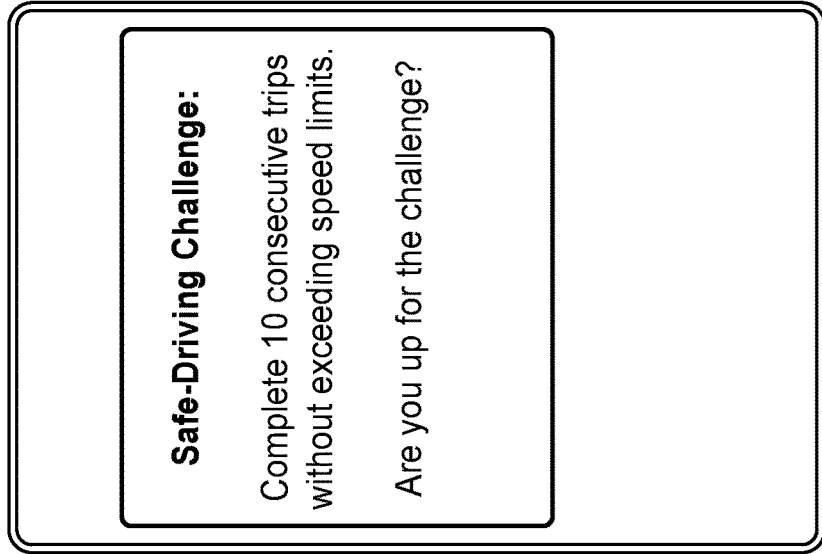
FIGS. 2A, 2B and 2C illustrate exemplary user interface displays for providing continuous safe-driver training, in accordance with some embodiments.
Figure 2B:
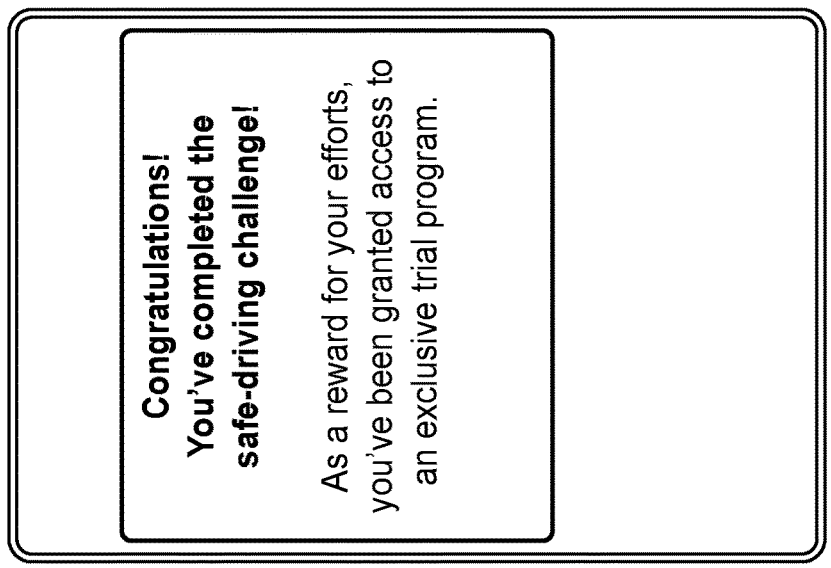
Figure 2C:
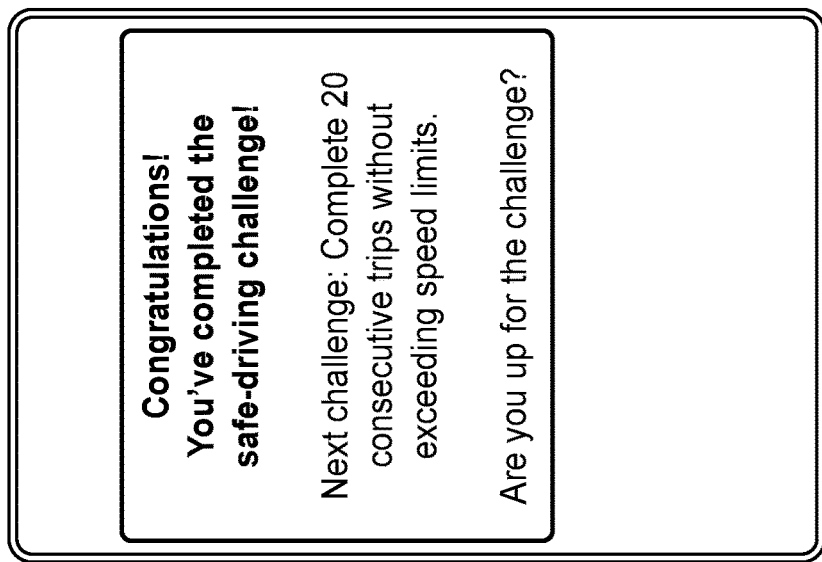

Referring now to FIGS. 2A, 2B, and 2C, exemplary user interface displays for providing continuous safe-driver training are illustrated, in accordance with some embodiments. As shown in FIG. 2A, a safe-driving challenge may be presented to an operator of a vehicle. The safe-driving challenge may include a metric for completion of the challenge, e.g., "Complete 10 consecutive trips without exceeding speed limits." As shown in FIG. 2B, when the operator of the vehicle completes the safe driving challenge (e.g., as indicated by an analysis of sensor data associated with the vehicle) a notification may be generated, e.g., congratulating the operator of the vehicle on the successful completion of the challenge. Moreover, the notification may include an indication that the operator of the vehicle has received a reward (e.g., an invitation to participate in an exclusive trial program) based on the completion of the safe-driving challenge. As shown in FIG. 2C, a second safe-driving challenge may be presented to the operator of the vehicle after the completion of the first safe-driving challenge. In some instances, the second safe-driving challenge may be a more difficult version of the first safe-driving challenge. For instance, after the operator completes a first challenge of completing 10 consecutive trips without exceeding speed limits, the second challenge presented to the vehicle operator may be: "Complete 20 consecutive trips without exceeding speed limits."

Figure 3:
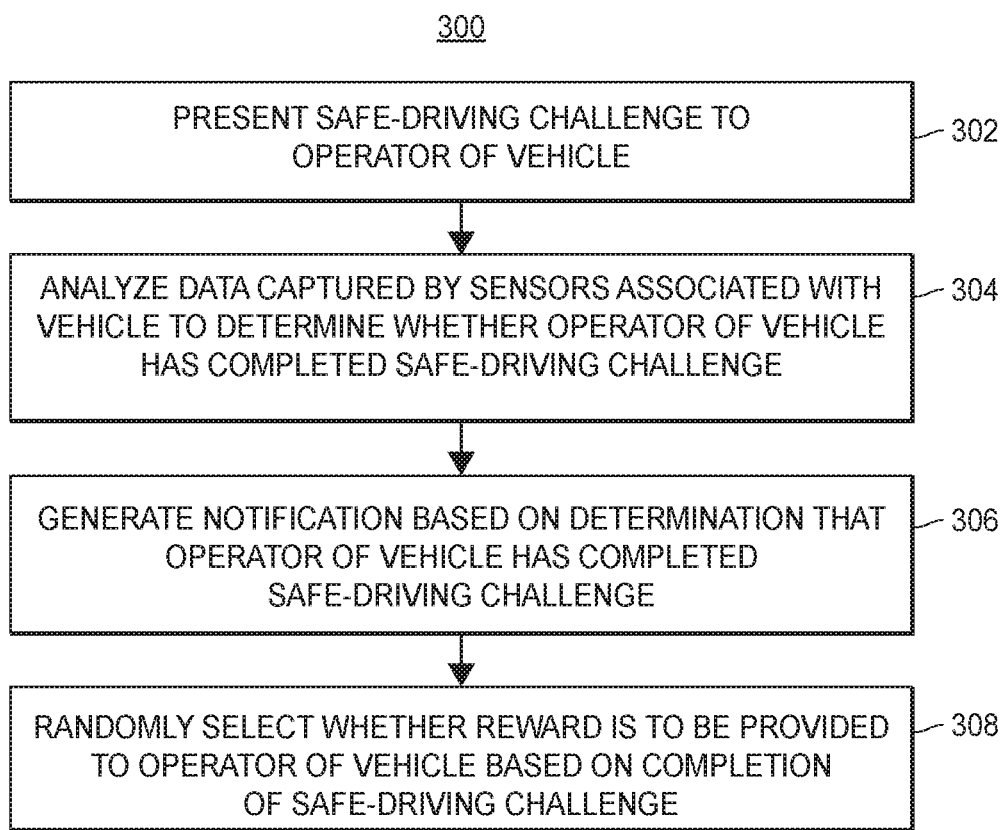
FIG. 3 illustrates a flow diagram of an exemplary computer-implemented method of providing continuous safe-driver training, in accordance with some embodiments.

Referring now to FIG. 3, a flow diagram of an exemplary computer-implemented method 300 of providing continuous safe-driver training is illustrated, in accordance with some embodiments. The method 300 can be implemented as a set of instructions stored on a computer-readable memory and executable on one or more processors.

A safe-driving challenge may be presented (block 302) to an operator of a vehicle. The safe-driving challenge may be presented via a user interface of a mobile device and/or onboard computer associated with the vehicle, e.g., as shown in FIG. 2A. In some instances, the safe-driving challenge may be framed as a "quest" or "mission." In particular, the safe-driving challenge may include one or more parameters for completion by the vehicle operator. For instance, the safe-driving challenge may be presented as a goal to be achieved over time, or over a certain number of trips. For example, a vehicle operator may be challenged to complete 10 trips without hard braking. As another example, a vehicle operator may be challenged drive for one week without exceeding speed limits. As still another example, the safe-driving challenge may be related to maintaining a "streak" of trips without hard cornering, e.g., compared to previous personal record. In some embodiments, the challenge may be presented alongside tips or tricks for achieving the challenge. For example, if the vehicle operator is challenged to drive for one week without hard braking, tips related to avoiding hard braking may periodically be presented to the vehicle operator during that week.

In some instances, the safe-driving challenge presented to a particular operator may be selected based on data captured by the sensors associated with the operator's vehicle. For example, a vehicle operator whose sensor data indicates repeated issues with cornering may be presented with a cornering-related challenge, while a vehicle operator whose sensor data indicates repeated issues with following speed limits may be presented with a speed-limit challenge.

Data captured by sensors associated with the vehicle may be analyzed (block 304) to determine whether the operator of the vehicle has completed the safe driving challenge. For example, the data captured by the sensors associated with the vehicle may include speed data, acceleration data, braking data, cornering data, object range distance data, turn signal data, seatbelt use data, location data, phone use data, weather data, road type data, etc. The data captured by the sensors associated with the vehicle may be analyzed to identify, e.g., a number of vehicle trips and/or a number of consecutive vehicle trips in which the data captured by sensors associated with the vehicle indicates operation of the vehicle in accordance with the parameters of the challenge, a frequency of vehicle trips in which the data captured by sensors associated with the vehicle indicates operation of the vehicle in accordance with the parameters of the challenge, a duration of vehicle operation time during which the data captured by sensors associated with the vehicle indicates operation of the vehicle in accordance with the parameters of the challenge, a distance traveled by a vehicle during which the data captured by sensors associated with the vehicle indicates operation of the vehicle in accordance with the parameters of the challenge, a number of calendar days during which the data captured by sensors associated with the vehicle indicates operation of the vehicle in accordance with the parameters of the challenge, etc. For instance, acceleration data captured over time may be used to determine a frequency of vehicle trips in which the vehicle operator accelerates safely. As another example, speed data captured over time may be used to determine whether a vehicle operator follows speed limits over the course of a week.

A notification to the operator may be generated (block 306) based on the determination that the operator of the vehicle has completed the safe-driving challenge. The notification may be displayed on a user interface of a mobile device and/or on-board computer associated with a vehicle, e.g., as shown in FIG. 2B. For instance, the notification may indicate the operator of the vehicle that he or she has completed the safe-driving challenge, and may include verbal praise, congratulations, or other positive feedback related to the completion of the safe-driving challenge.

A determination of whether a reward is to be provided to the operator of the vehicle (or not) based on the determination that the operator of the vehicle has completed the safe-driving challenge may be randomly selected (block 308). For example, a random number generator application may be used to generate a random number. Some numbers may be associated with an outcome of providing a reward to the operator of the vehicle, while other numbers may be associated with an outcome of not providing a reward to the operator of the vehicle. For instance, even numbers may correspond to providing a reward to the operator of the vehicle, while odd numbers may correspond to not providing a reward to the operator of the vehicle, or vice versa. Accordingly, based on the number generated by the random number generator, a reward may be provided to the operator of the vehicle, or may not be provided to the operator of the vehicle. If a reward is to be provided to an operator of a vehicle, a notification may be presented to the operator of the vehicle indicating that the operator is to receive a reward (e.g., as shown in FIG. 2B).

In some instances, a type of reward to be provided to the operator of the vehicle based on the determination that the operator of the vehicle has completed the safe-driving challenge may also be randomly selected. The type of reward may be randomly selected in a similar way as the determination of whether a reward is to be provided. For instance, a random number generator application may be used to generate a random number. Some numbers may be associated with certain types of rewards. For instance, types of rewards may include discounts (e.g., from insurance providers or from other third parties), promotional products (including products related to safe driving and/or safe vehicle operation, such as helmets), and/or access to participate in a trial program. Accordingly, based on the number generated by the random number generator, a certain type of reward may be provided to the operator of the vehicle. A notification may be presented to the operator of the vehicle indicating the type of reward that the operator is to receive (e.g., as shown in FIG. 2B).

In some instances, after the operator of the vehicle has completed a first safe-driving challenge, a second safe-driving challenge may be presented to the operator of the vehicle (and a third safe-driving challenge may be presented to the operator of the vehicle after the completion of the second safe-driving challenge, and so on). In some instances, the second safe-driving challenge may be similar to the first safe-driving challenge but somewhat more difficult. For instance, if the first safe-driving challenge included parameters of driving for one week without speeding, the second safe-driving challenge may include parameters of driving for two weeks without speeding or driving for one month without speeding. A notification may be presented to the operator, indicating a second safe-driving challenge (e.g., as shown in FIG. 2C).

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method of providing safe-driver training, the method comprising:
   identifying, by a processor, driving skill deficiencies of a driver of a vehicle from data captured by sensors;
   presenting, by the processor, a first safe-driving challenge to the driver of the vehicle based upon at least the identified driving skill deficiencies, the first safe-driving challenge targeting a type of driving skill deficiency found in the identified driving skill deficiencies for the driver of the vehicle to improve upon, wherein the first safe-driving challenge is presented with one or more tips for achieving one or more parameters of the first safe-driving challenge;
   analyzing, by the processor, the data captured by the sensors to determine that the driver of the vehicle has completed the first safe-driving challenge by at least:
     analyzing the data captured by the sensors to identify a duration of vehicle operation time during which the data captured by the sensors indicate operation of the vehicle in accordance with the one or more parameters of the first safe-driving challenge; and
   receiving, by the processor, a randomly selected type of reward based upon determining that the driver of the vehicle has completed the first safe-driving challenge, wherein the type of reward is randomly selected from a plurality of types of rewards.

2. The computer-implemented method of claim 1, further comprising:
   determining, by the processor, whether a reward is to be provided to the driver of the vehicle based upon determining that the driver of the vehicle has completed the first safe-driving challenge.

3. The computer-implemented method of claim 1, wherein the type of reward is at least one of selected from a group consisting of: a discount, a product related to safe driving, a promotional product, and access to participate in a trial program.

4. The computer-implemented method of claim 1, wherein the data captured by the sensors include at least one of selected from a group consisting of: speed data, acceleration data, braking data, cornering data, object range distance data, turn signal data, seatbelt use data, location data, phone use data, weather data, and road type data.

5. The computer-implemented method of claim 1, further comprising:
   generating, by the processor, based upon determining that the driver of the vehicle has completed the first safe-driving challenge, a notification to the driver of the vehicle, the notification comprising the selected type of reward.

6. The computer-implemented method of claim 1, wherein the analyzing, by the processor, the data captured by the sensors to determine that the driver of the vehicle has completed the first safe-driving challenge further includes analyzing the data captured by the sensors to identify at least one selected from a group consisting of:
   a number of vehicle trips and/or a number of consecutive vehicle trips in which the data captured by the sensors indicate operation of the vehicle in accordance with the one or more parameters of the first safe-driving challenge;
   a frequency of vehicle trips in which the data captured by the sensors indicate operation of the vehicle in accordance with the one or more parameters of the first safe-driving challenge;
   a distance traveled by the vehicle during which the data captured by the sensors indicate operation of the vehicle in accordance with the one or more parameters of the first safe-driving challenge; and
   a number of calendar days during which the data captured by the sensors indicate operation of the vehicle in accordance with the one or more parameters of the first safe-driving challenge.

7. The computer-implemented method of claim 1, further comprising:
   after the driver of the vehicle has completed the first safe-driving challenge, presenting, by the processor, a second safe-driving challenge to the driver of the vehicle based upon the first safe-driving challenge and the data captured by the sensors.

8. A computer system for providing continuous safe-driver training, the system comprising:
one or more memories storing instructions thereon; and
one or more processors configured to execute the instructions and perform operations comprising:
identifying driving skill deficiencies of a driver of a vehicle from data captured by sensors;
presenting a first safe-driving challenge to the driver of the vehicle based upon at least the identified driving skill deficiencies, the first safe-driving challenge targeting a type of driving skill deficiency found in the identified driving skill deficiencies for the driver of the vehicle to improve upon, wherein the first safe-driving challenge is presented with one or more tips for achieving one or more parameters of the first safe-driving challenge;
analyzing the data captured by the sensors to determine that the driver of the vehicle has completed the first safe-driving challenge by at least:
analyzing the data captured by the sensors to identify a duration of vehicle operation time during which the data captured by the sensors indicate operation of the vehicle in accordance with the one or more parameters of the first safe-driving challenge; and
receiving a randomly selected type of reward based upon determining that the driver of the vehicle has completed the first safe-driving challenge, wherein the type of reward is randomly selected from a plurality of types of rewards.

9. The computer system of claim 8, wherein the operations further comprise:
determining whether a reward is to be provided to the driver of the vehicle based upon determining that the driver of the vehicle has completed the first safe-driving challenge.

10. The computer system of claim 8, wherein the type of reward is at least one of selected from a group consisting of: a discount, product related to safe driving, a promotional product, and access to participate in a trial program.

11. The computer system of claim 8, wherein the data captured by the sensors include at least one of selected from a group consisting of: speed data, acceleration data, braking data, cornering data, object range distance data, turn signal data, seatbelt use data, location data, phone use data, weather data, and road type data.

12. The computer system of claim 8, wherein the operations further comprise:
generating, based upon determining that the driver of the vehicle has completed the first safe-driving challenge, a notification to the driver of the vehicle, the notification comprising the selected type of reward.

13. The computer system of claim 8, wherein the operations further comprise:
analyzing the data captured by the sensors to identify at least one selected from a group consisting of:
a number of vehicle trips and/or a number of consecutive vehicle trips in which the data captured by the sensors indicate operation of the vehicle in accordance with the one or more parameters of the first safe-driving challenge;
a frequency of vehicle trips in which the data captured by the sensors indicate operation of the vehicle in accordance with the one or more parameters of the first safe-driving challenge;
a distance traveled by the vehicle during which the data captured by the sensors indicate operation of the vehicle in accordance with the one or more parameters of the first safe-driving challenge; and
a number of calendar days during which the data captured by the sensors indicate operation of the vehicle in accordance with the one or more parameters of the first safe-driving challenge.

14. The computer system of claim 8, wherein the operations further comprise:
after the driver of the vehicle has completed the first safe-driving challenge, presenting a second safe-driving challenge to the driver of the vehicle based upon the first safe-driving challenge and the data captured by the sensors.

15. A non-transitory computer-readable storage medium having stored thereon a set of instructions for providing safe-driver training, executable by a processor, the set of instructions comprising instructions for:
identifying driving skill deficiencies of a driver of a vehicle from data captured by sensors;
presenting a first safe-driving challenge to the driver of the vehicle based upon at least the identified driving skill deficiencies, the first safe-driving challenge targeting a type of driving skill deficiency in the identified driving skill deficiencies for the driver of the vehicle to improve upon, wherein the first safe-driving challenge is presented with one or more tips for achieving one or more parameters of the first safe-driving challenge;
analyzing the data captured by the sensors to determine that the driver of the vehicle has completed the first safe-driving challenge by at least:
analyzing the data captured by the sensors to identify a duration of vehicle operation time during which the data captured by the sensors indicate operation of the vehicle in accordance with the one or more parameters of the first safe-driving challenge; and
receiving a randomly selected type of reward based upon determining that the driver of the vehicle has completed the first safe-driving challenge, wherein the type of reward is randomly selected from a plurality of types of rewards.

16. The non-transitory computer-readable storage medium of claim 15, wherein the set of instructions further comprise instructions for:
determining whether a reward is to be provided to the driver of the vehicle based upon determining that the driver of the vehicle has completed the first safe-driving challenge.

17. The non-transitory computer-readable storage medium of claim 15, wherein the type of reward is at least one selected from a group consisting of: a discount, product related to safe driving, a promotional product, and access to participate in a trial program.

18. The non-transitory computer-readable storage medium of claim 15, wherein the data captured by the sensors include at least one of selected from a group consisting of: speed data, acceleration data, braking data, cornering data, object range distance data, turn signal data, seatbelt use data, location data, phone use data, weather data, and road type data.

19. The non-transitory computer-readable storage medium of claim 15, wherein the set of instructions further comprise instructions for:
after the driver of the vehicle has completed the first safe-driving challenge, presenting a second safe-driving challenge to the driver of the vehicle based upon the first safe-driving challenge and the data captured by the sensors.

20. The non-transitory computer-readable storage medium of claim 15, wherein the set of instructions further comprise instructions for analyzing the data captured by the sensors to identify at least one selected from a group consisting of:
- a number of vehicle trips and/or a number of consecutive vehicle trips in which the data captured by the sensors indicate operation of the vehicle in accordance with the one or more parameters of the first safe-driving challenge;
- a frequency of vehicle trips in which the data captured by the sensors indicate operation of the vehicle in accordance with the one or more parameters of the first safe-driving challenge;
- a distance traveled by the vehicle during which the data captured by the sensors indicate operation of the vehicle in accordance with the one or more parameters of the first safe-driving challenge; and
- a number of calendar days during which the data captured by the sensors indicate operation of the vehicle in accordance with the one or more parameters of the first safe-driving challenge.

\* \* \* \* \*